(12) United States Patent
Thiel et al.

(10) Patent No.: US 9,584,966 B1
(45) Date of Patent: Feb. 28, 2017

(54) DETERMINING AN INDOOR/OUTDOOR CLASSIFICATION FOR A CALL

(71) Applicant: JDSU UK Limited, Berkshire (GB)

(72) Inventors: Stefan Ulrich Thiel, Berkshire (GB); Gareth James Smith, Berkshire (GB); John Joseph Holden, Reading (GB); Ryan Clark, Swindon (GB)

(73) Assignee: Viavi Solutions UK Limited, Berkshire (GB)

( * ) Notice: Subject to any disclaimer, the term of this patent is extended or adjusted under 35 U.S.C. 154(b) by 0 days.

(21) Appl. No.: 14/870,674

(22) Filed: Sep. 30, 2015

(51) Int. Cl.
*H04W 24/00* (2009.01)
*H04W 4/02* (2009.01)
*H04W 24/08* (2009.01)
*G01S 5/00* (2006.01)
*G01S 5/02* (2010.01)
*H04W 4/04* (2009.01)
*H04W 64/00* (2009.01)

(52) U.S. Cl.
CPC .............. *H04W 4/02* (2013.01); *G01S 5/0036* (2013.01); *G01S 5/0252* (2013.01); *H04W 4/027* (2013.01); *H04W 4/043* (2013.01); *H04W 4/046* (2013.01); *H04W 24/08* (2013.01); *H04W 64/003* (2013.01)

(58) Field of Classification Search
CPC ....... H04W 4/02; H04W 4/027; H04W 4/043; H04W 4/046; H04W 24/08; H04W 64/003; G01S 5/0036; G01S 5/0252
USPC .................................. 455/456.1, 456.5, 414.2
See application file for complete search history.

(56) References Cited

U.S. PATENT DOCUMENTS

| | | | |
|---|---|---|---|
| 6,728,215 B1* | 4/2004 | Alperovich | H04L 29/06027 370/252 |
| 7,313,402 B1* | 12/2007 | Rahman | H04W 24/06 455/456.1 |
| 8,423,047 B1* | 4/2013 | Zang | G01S 5/0242 370/328 |
| 2007/0049295 A1* | 3/2007 | Soliman | G01S 5/0252 455/456.3 |
| 2013/0190010 A1* | 7/2013 | Chiou | G01S 5/0252 455/456.1 |
| 2015/0189479 A1* | 7/2015 | Kenington | H04W 4/043 455/456.1 |

(Continued)

FOREIGN PATENT DOCUMENTS

EP 2 626 719 A2 2/2013

*Primary Examiner* — Khai M Nguyen
(74) *Attorney, Agent, or Firm* — Harrity & Harrity, LLP

(57) ABSTRACT

A device may be configured to obtain metric information relating to an operating environment. The metric information may describe a signal strength or a signal quality associated with one or more calls placed in the operating environment. The device may be configured to obtain a threshold for the metric information. The device may be configured to determine indoor/outdoor classification information that identifies whether the one or more calls are classified as an indoor call or an outdoor call or an unclassified call based on whether the metric information satisfies the threshold. The device may be configured to determine geolocation information identifying one or more geographical locations associated with the one or more calls. The device may be configured to provide the indoor/outdoor classification information and the geolocation information.

20 Claims, 9 Drawing Sheets

(56) References Cited

U.S. PATENT DOCUMENTS

2016/0157060 A1* 6/2016 Wyles .................. H04W 64/00
                                              455/456.1

* cited by examiner

DETERMINING AN INDOOR/OUTDOOR CLASSIFICATION FOR A CALL

BACKGROUND

A mobile device may place a call (e.g., a voice call, a video call, a Voice over IP (VoIP) call, a Voice over LTE (VoLTE) call, a data call, a web browsing session, a file transfer protocol (FTP) session, a file upload/download, etc.) via a base station of a mobile network. The mobile network (e.g., a network resource of the mobile network) may collect metric information (e.g., a reference signal received power (RSRP), a received signal code power (RSCP), a received signal level (RxLev), etc.) pertaining to signal strength and/or signal quality at the mobile device and/or the base station. Based on the metric information and information relating to an area where the mobile device is located as the mobile device places the call, a device may classify the call as being placed indoors (e.g., within the confines of a building, in an indoor environment) or being placed outdoors (e.g., outside the confines of a building, in an outdoor environment).

SUMMARY

According to some possible implementations, a device may include one or more processors configured to obtain metric information relating to an operating environment. The metric information may describe a signal strength or a signal quality associated with one or more calls placed in the operating environment. The one or more processors may be configured to obtain a threshold for the metric information. The one or more processors may be configured to determine indoor/outdoor classification information that identifies whether the one or more calls are classified as an indoor call or an outdoor call based on whether the metric information satisfies the threshold. The one or more processors may be configured to determine geolocation information identifying one or more geographical locations associated with the one or more calls. The one or more processors may be configured to provide the indoor/outdoor classification information and the geolocation information.

According to some possible implementations, a non-transitory computer-readable medium may store one or more instructions that, when executed by one or more processors, may cause the one or more processors to obtain metric information. The metric information may identify a signal strength or a signal quality of one or more calls. The one or more instructions, when executed by one or more processors, may cause the one or more processors to obtain a threshold for the one or more calls. The one or more instructions, when executed by one or more processors, may cause the one or more processors to determine indoor/outdoor classification information that identifies whether the one or more calls are classified as indoor calls or outdoor calls based on whether the metric information satisfies the threshold. The one or more instructions, when executed by one or more processors, may cause the one or more processors to determine geolocation information identifying a geographical location associated with the one or more calls. The one or more instructions, when executed by one or more processors, may cause the one or more processors to provide the indoor/outdoor classification information and the geolocation information.

According to some possible implementations, a method may include obtaining, by a device, metric information for one or more calls associated with an area. The method may include determining, by the device, a threshold associated with the area. The method may include determining, by the device, indoor/outdoor classification information that identifies whether the one or more calls are classified as indoor calls or outdoor calls based on whether the metric information satisfies the threshold. The method may include determining, by the device, geolocation information identifying one or more geographical locations associated with the one or more calls. The method may include providing, by the device, the indoor/outdoor classification information and the geolocation information for processing or storage.

DETAILED DESCRIPTION

Figure 1A:
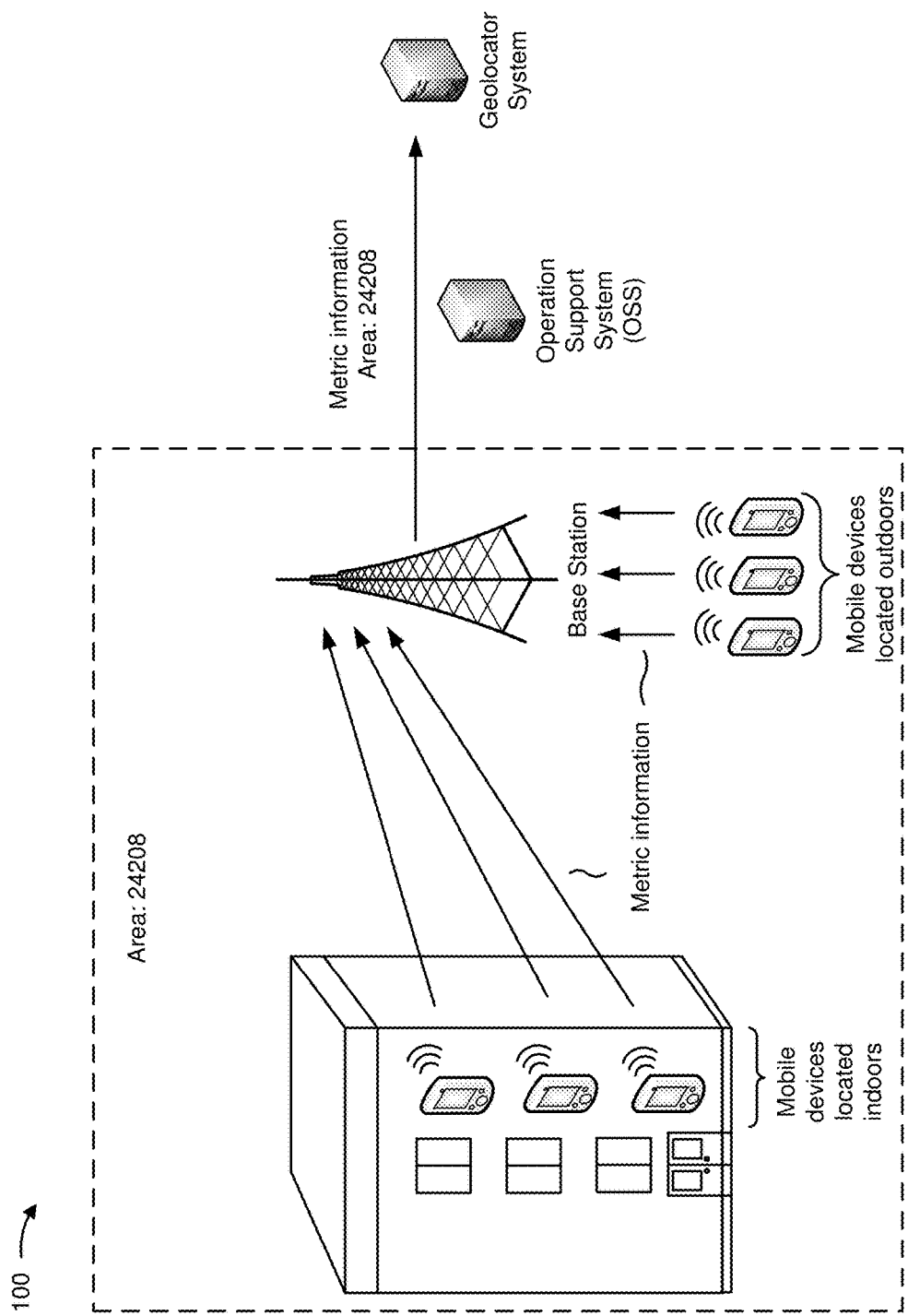
FIGS. 1A and 1B are diagrams of an overview of an example implementation described herein.

The following detailed description of example implementations refers to the accompanying drawings. The same reference numbers in different drawings may identify the same or similar elements.

A mobile device may place a call via a mobile network (e.g., a Global System for Mobile Communications (GSM) network, a Universal Mobile Telecommunications System (UMTS) network, a Long Term Evolution (LTE) network, etc.). A device may collect metric information relating to channel information for the call, such as a signal strength and/or signal quality of a signal associated with the call, a quality measurement for an area in which the call is placed (e.g., a quality measurement for a cell, bin, and/or sector of the mobile network, a quality measurement for a WiFi network in range of the mobile device, etc.), information relating to a device-to-device connection between the mobile device and another mobile device, and/or other associated metrics. Based on the metric information, the call may be classified as being placed indoors or outdoors. For example, a call that is associated with metric information that does not satisfy a metric threshold (e.g., that indicates low signal strength or low signal quality) may be classified as being placed indoors, and another call that is associated with metric information that satisfies the metric threshold (e.g., that indicates high signal strength or high signal quality) may be classified as being placed outdoors.

Classifying whether the call is placed indoors or outdoors may be resource-intensive for a device that performs the classification. Furthermore, the mobile network may route a large quantity of calls, so performing a post hoc analysis of the large quantity of calls may be impractical. Even further, the classification of the calls may be more accurate when performed based on more recent information. For example, when the metric threshold is determined based on more recent call data, the metric threshold may provide more accurate classifications of subsequent call data.

Implementations described herein permit a geolocator system to determine indoor/outdoor classifications for calls as the geolocator system determines other geolocation information (e.g., a geographical location the mobile device that places the call, a determination of whether the mobile device is in a moving vehicle, etc.). Further, implementations described herein permit the geolocator system, or another device, to queue classified call data for storage, which reduces impact of the classification operation on processing and storage speed. Based on the classified call data, a network operator may improve performance of the network. For example, if problematic calls in a particular area are typically placed indoors, the network operator may deploy additional microcells, femtocells, or the like, in the indoor areas associated with the problematic calls and/or may tune existing microcells/femtocells. As another example, if problematic calls in a particular area are typically placed outdoors, the network operator may deploy another macrocell for the outdoor area and/or may tune existing macrocells.

Figure 1B:
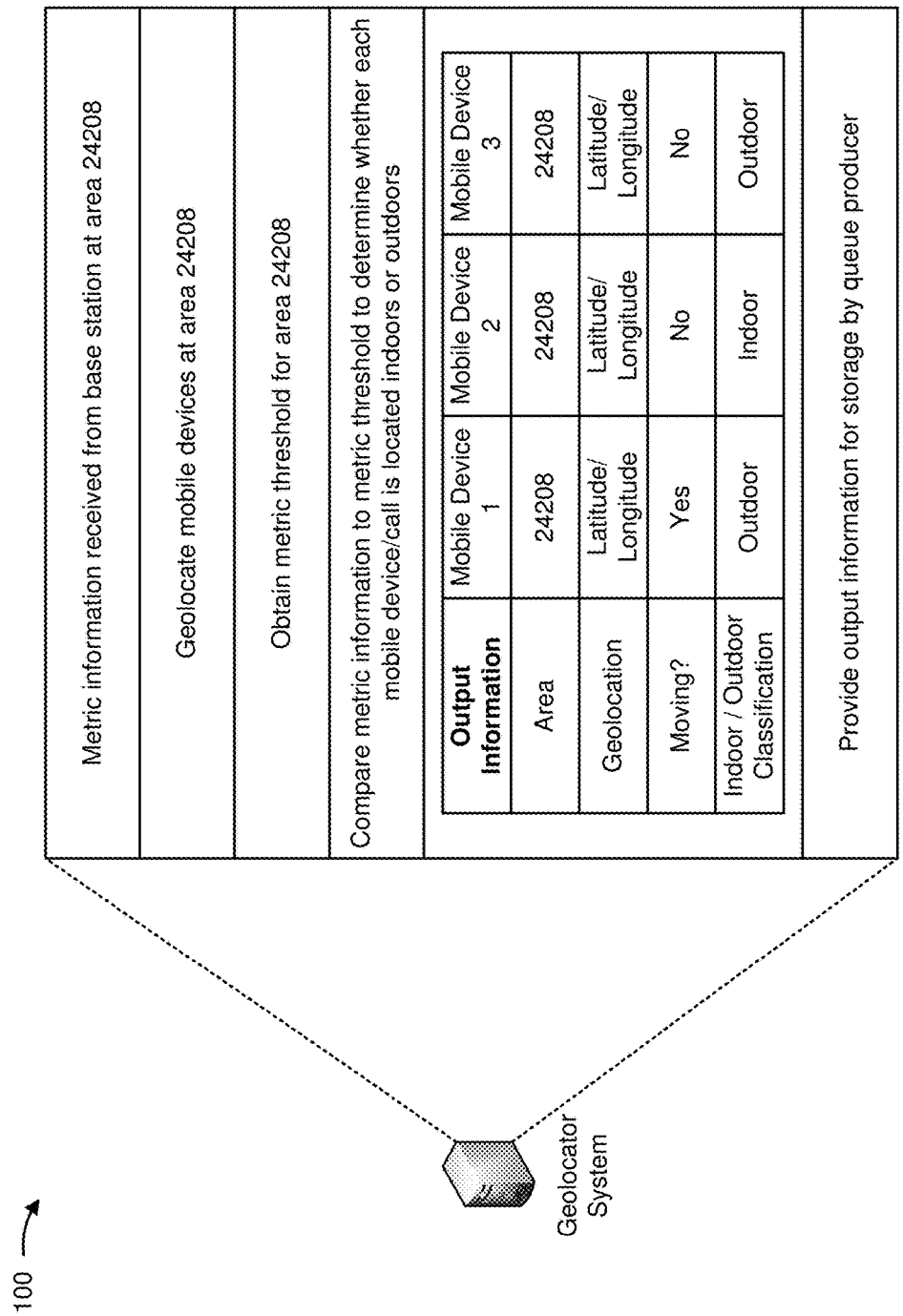

FIGS. 1A and 1B are diagrams of an overview of an example implementation 100 described herein. As shown in FIG. 1A, mobile devices in a particular area (e.g., area 24208, which may include a cell of a mobile network, a sector of a mobile network, a bin of a cell or of a sector, an expected wireless access point coverage area, an expected coverage area of a base station, an expected coverage area of a relay node, a discoverable area around a mobile device with a known indoor/outdoor classification, etc.) may place calls via a base station of a mobile network. As further shown, some of the mobile devices may be located indoors in the particular area, and others of the mobile devices may be located outdoors in the particular area. As shown, the mobile devices may provide metric information to the mobile network via the base station. The metric information may include, for example, an RSRP measurement (e.g., for an LTE network), an RSCP measurement (e.g., for a UMTS network), an RxLev measurement (e.g., for a GSM network), a signal strength value for a wireless access point (e.g., a WiFi access point, etc.) that is in range of one or more of the mobile devices, an availability of a device-to-device link, a quality of a device-to-device link, a throughput of a device-to-device link, an availability of a relay link, a quality of a relay link, or another type of metric.

As further shown, an operations support system (OSS) may obtain the metric information. For example, the network resource may obtain call trace information that describes the calls placed by the mobile devices in the particular area. In such cases, the call trace information may include the metric information for the calls placed in the particular area.

As shown in FIG. 1B, a geolocator system may obtain the metric information for the calls placed in the particular area. As further shown, based on the metric information, the geolocator system may geolocate the mobile devices that placed the calls. For example, the geolocator system may compare signal strengths from different base stations in the particular area, may compare receipt times of signals from the mobile devices for different base stations in the particular area, may obtain geolocation information from the mobile devices, or the like.

As further shown, the geolocator system may obtain a metric threshold for the particular area that is identified by the geolocation information (e.g., area 24208). The metric threshold may be determined by a measurement processor device based on past metric information and past indoor/outdoor classification information for calls placed in the particular area, as described in more detail below.

As shown, the geolocator system may compare the metric information to the metric threshold to determine whether the calls placed in the particular area were placed indoors or outdoors. Based on whether the metric information for each call satisfies the metric threshold, the geolocator system may classify a call associated with the metric information as an indoor call or an outdoor call. In some implementations, the geolocator system may classify the call based on other information (e.g., information indicating that the call was placed in a moving vehicle, global positioning system (GPS) information, information relating to a device-to-device link, information relating to a relay link, information relating to a wireless access point in range of the mobile device during the call, etc.).

As shown, the geolocator system may provide output information for the calls placed by the mobile devices in the particular area. As shown, the output information may include information identifying the particular area, geolocation information for the mobile devices (e.g., a latitude/longitude measurement, an x/y offset from a reference point, etc.), information indicating whether the call was placed in a moving vehicle (mobility information), an indoor/outdoor classification for a call, or the like. As further shown, the geolocator system may provide the geolocation information to a queue producer for a queueing system (e.g., an Apache Kafka queuing system, an ActiveMQ queueing system, etc.).

In this way, the geolocator system determines an indoor/outdoor classification for a call based on metric information and a metric threshold relating to the area in which the call is placed. Further, the geolocator system determines the indoor/outdoor classification as the geolocator system determines geolocation information for the call, which reduces processor and/or storage requirements for determining the indoor/outdoor classification.

Figure 2:
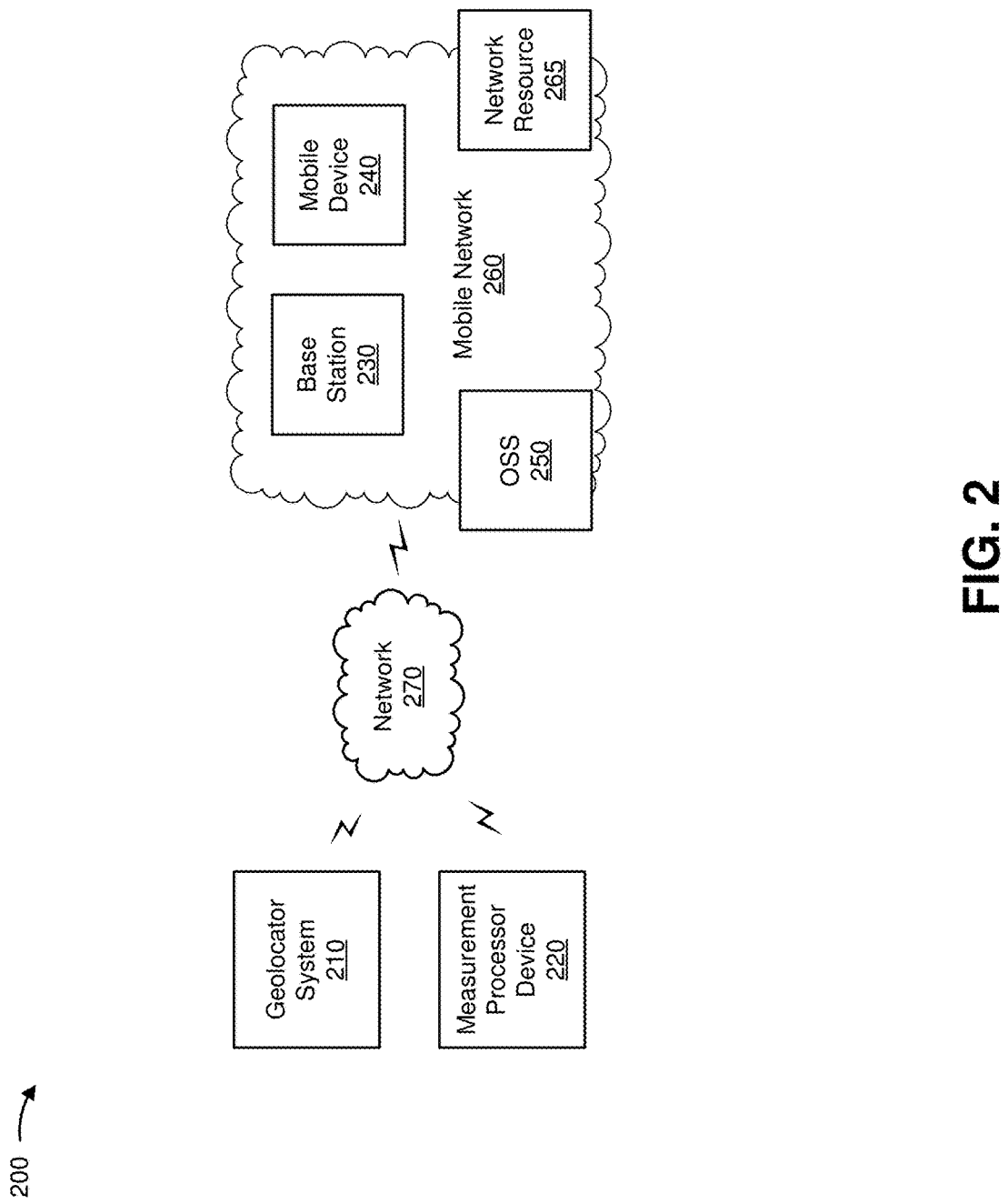
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a geolocator system 210, a measurement processor device 220, a base station 230, a mobile device 240, a mobile network 260 with network resources 265, and a network 270. Devices of environment 200 may interconnect via wired connections, wireless connections, or a combination of wired and wireless connections.

Geolocator system 210 may include one or more devices capable of receiving, generating, storing, processing, and/or providing information, such as information described herein. For example, geolocator system 210 may include one or more computing devices, such as one or more server devices, desktop computers, workstation computers, virtual machines (VMs) provided in a cloud computing environment, or similar devices. In some implementations, geolocator system 210 may be utilized by an entity that manages and/or operates one or more portions of environment 200, such as, for example, a telecommunication service provider, a television service provider, an Internet service provider, or the like.

Measurement processor device 220 may include one or more devices capable of receiving, generating, storing, processing, and/or providing information, such as information described herein. For example, measurement processor device 220 may include one or more computing devices, such as one or more server devices, desktop computers, workstation computers, virtual machines (VMs) provided in a cloud computing environment, or similar devices. In some implementations, measurement processor device 220 may be utilized by an entity that manages and/or operates one or more portions of environment 200, such as, for example, a telecommunication service provider, a television service provider, an Internet service provider, or the like.

Base station 230 may include one or more devices capable of transferring traffic, such as audio, video, text, and/or other traffic, destined for and/or received from mobile device 240. In some implementations, base station 230 may include an eNB associated with an LTE network that receives traffic from and/or sends traffic to network 270. Additionally, or alternatively, one or more base stations 230 may be associated with a RAN that is not associated with the LTE network. Base station 230 may send traffic to and/or receive traffic from mobile device 240 via an air interface. In some implementations, base station 230 may include a small cell base station, such as a base station of a microcell, a picocell, and/or a femtocell. In some implementations, base station 230 may communicate with another base station 230 of mobile network 260 regarding measurement information, network performance information, or the like.

Mobile device 240 may include one or more devices capable of communicating with base station 230 and/or a network (e.g., mobile network 260, network 270, etc.). For example, mobile device 240 may include a wireless communication device, a radiotelephone, a personal communications system (PCS) terminal (e.g., that may combine a cellular radiotelephone with data processing and data communications capabilities), a smart phone, a smart meter, a vehicle, a vending machine, a laptop computer, a tablet computer, a personal gaming system, and/or a similar device. Mobile device 240 may send traffic to and/or receive traffic from network 270 (e.g., via base station 230).

OSS 250 may include one or more devices that manage mobile network 260. For example, OSS may perform network inventory operations, service provisioning operations, network configuration operations, fault management operations, or the like.

Mobile network 260 may include a mobile communications network, such as a 3G mobile network, a 4G mobile network, a 5G mobile network, a heterogeneous network, a Global System for Mobile Communications (GSM) mobile network, and/or a combination of these or other types of networks. In some implementations, mobile network 260 may correspond to an evolved packet system (EPS) that includes OSS 250, a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may include a base station (eNB). The EPC network may include a mobility management entity (MME), a serving gateway (SGW), a policy and charging rules function (PCRF), a PDN gateway (PGW), a base station controller (BSC), a radio network controller (RNC), an operations and maintenance centre (OMC), a network management system (NMS) and/or a network management center (NMC). The IMS network may include a home subscriber server (HSS), a proxy call session control function (P-CSCF), an interrogating call session control function (I-CSCF), and a serving call session control function (S-CSCF).

In some implementations, mobile network 260 may include one or more network resources 265, such as, for example, the eNB, the MME, the SGW, the PCRF, the PGW, the HSS, the P-CSCF, the I-CSCF, the S-CSCF, or the like.

Network 270 may include one or more wired and/or wireless networks. For example, network 270 may include a mobile network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a cloud computing network, a private network, and/or a combination of these or other types of networks. In some implementations, network 270 may include one or more device-to-device wireless networks where communication may occur through direct communication between devices, under the control of network 270 or independently. In some implementations, direct device-to-device links may comprise one or more hops. Such direct device-to-device links may be used in a cooperative manner together with point-to-point and/or point-to-multi-point links mediated by network 270.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
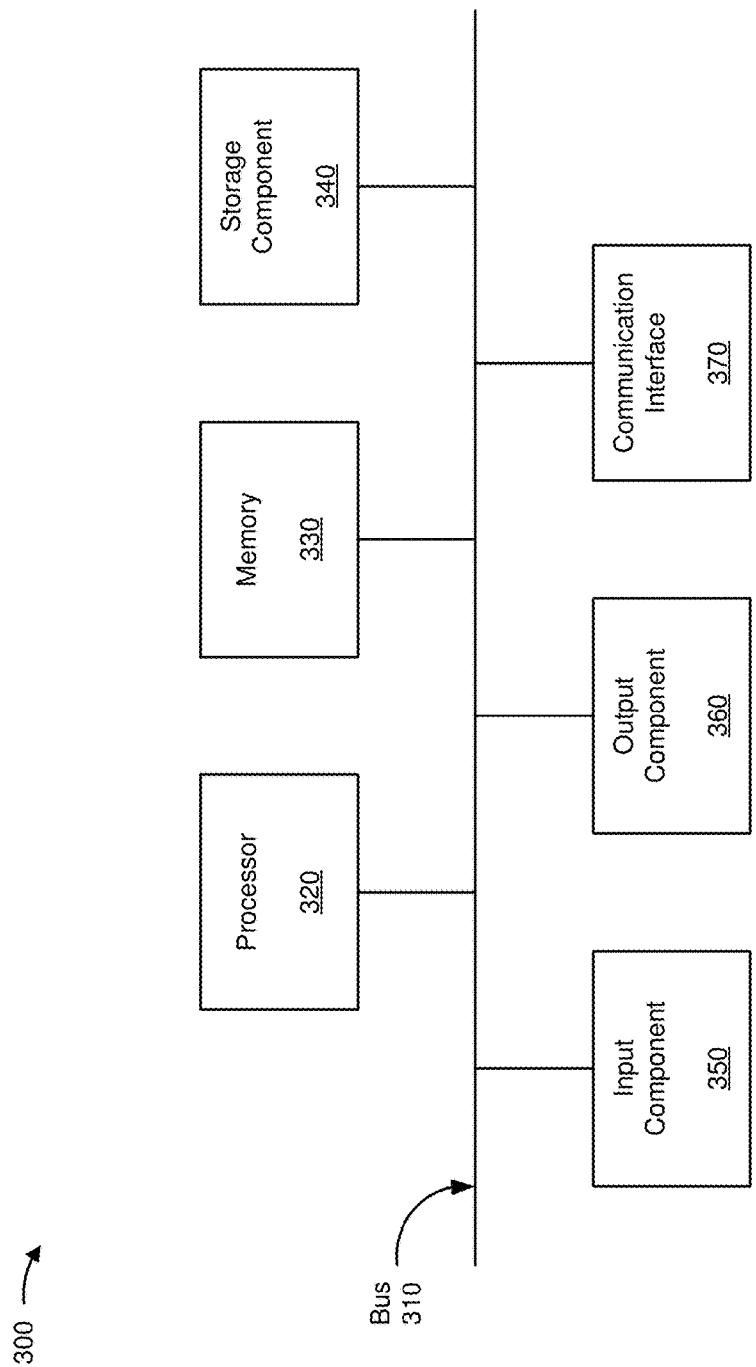
FIG. 3 is a diagram of example components of one or more devices of FIG. 2.

FIG. 3 is a diagram of example components of a device 300. Device 300 may correspond to geolocator system 210, measurement processor device 220, base station 230, mobile device 240, and/or network resource 265. In some implementations, geolocator system 210, measurement processor device 220, base station 230, mobile device 240, and/or network resource 265 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
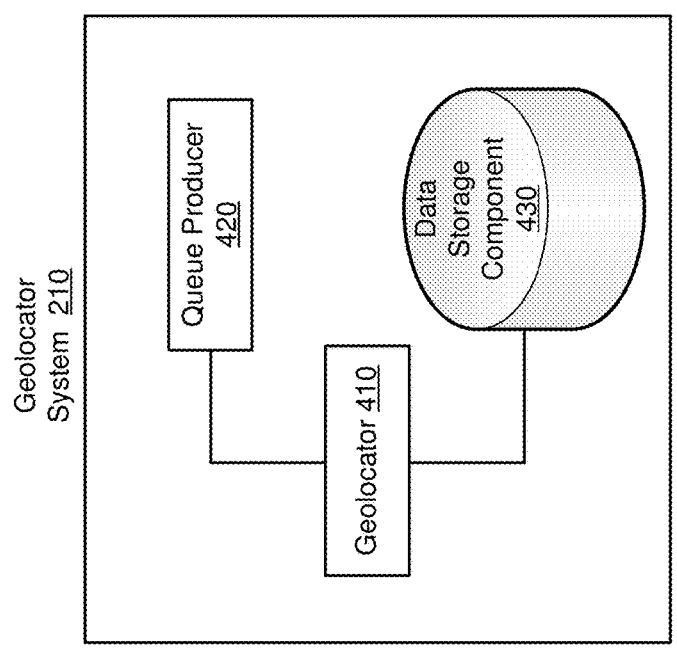
FIG. 4 is a diagram of example functional components of a geolocator system depicted in FIG. 2.

FIG. 4 is a diagram of example functional components of geolocator system 210. As shown in FIG. 4, geolocator system 210 may include a geolocator 410, a queue producer 420, and a data storage component 430.

Geolocator 410 may receive metric information relating to calls placed by mobile devices 240. Based on the metric information, and based on a metric threshold determined by measurement processor device 220, geolocator 410 may classify the calls based on whether the calls are placed indoors or outdoors. Geolocator 410 may provide geolocation information identifying a geographical location for a call, an indication of whether the call was placed in a moving vehicle, an indoor/outdoor classification of the call, or the like. Geolocator 410 may obtain the metric threshold from data storage component 430, in some implementations.

Queue producer 420 may receive information to be stored and may provide the information for storage (e.g., to data storage component 430, to measurement processor device 220, etc.). In some implementations, queue producer 420 may include a Kafka producer for an Apache Kafka queueing system, or a similar type of queue producer for a different queueing system. Queue producer 420 may receive metric information, geolocation information, indoor/outdoor classification information, call data information, or the like, from geolocator 410. Queue producer 420 may provide the information to data storage component 430 (e.g., based on a request from a queue consumer that writes to data storage component 430, based on availability of storage space for data storage component 430, based on an instruction from geolocator system 210, etc.).

Data storage component 430 may receive, store, and/or provide information (e.g., metric information, geolocation information, indoor/outdoor classification information, call data information, etc.). In some implementations, data storage component 430 may store information in memory local to geolocator system 210. Additionally, or alternatively, data storage component 430 may store information in memory local to measurement processor device 220 or in memory remote from geolocator system 210.

The number and arrangement of functional components shown in FIG. 4 are provided as an example. In practice, geolocator system 210 may include additional functional components, fewer functional components, different functional components, or differently arranged functional components than those shown in FIG. 4. Additionally, or alternatively, a set of functional components (e.g., one or more functional components) of geolocator system 210 may perform one or more functions described as being performed by another set of functional components of geolocator system 210.

Figure 5:
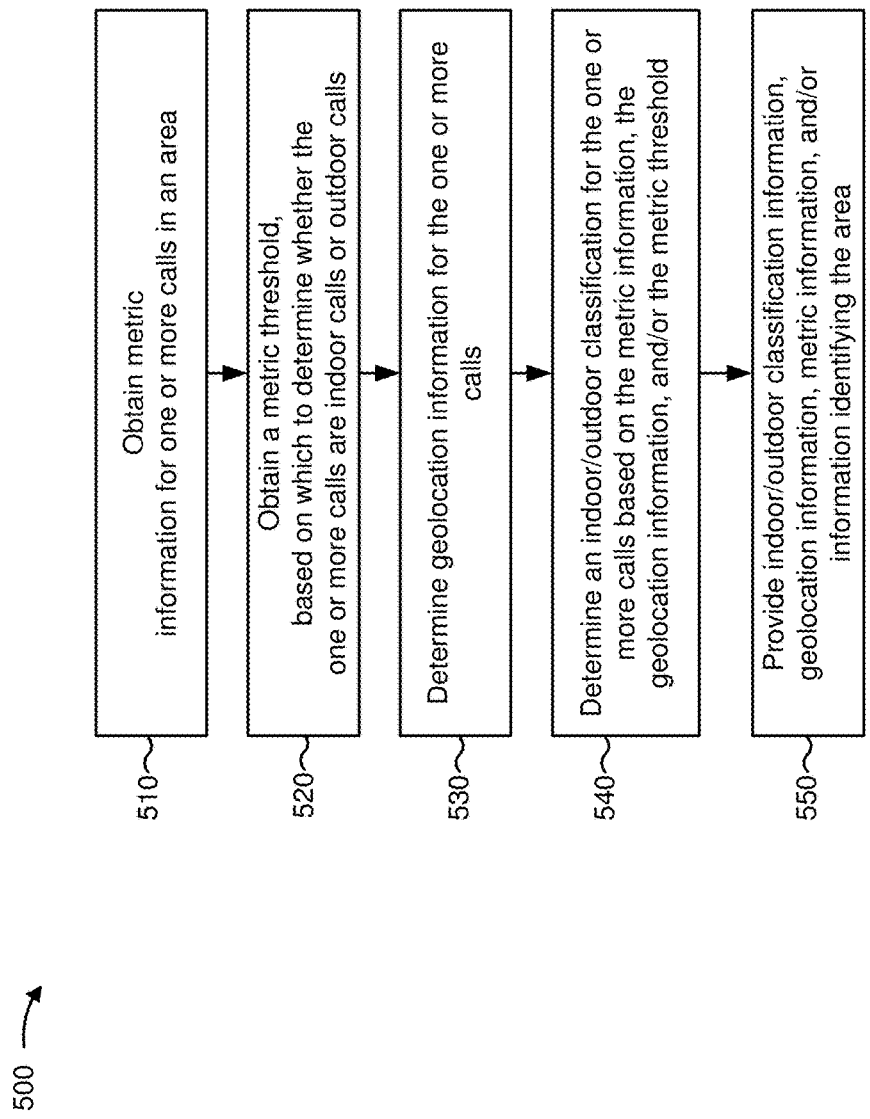
FIG. 5 is a flow chart of an example process for determining an indoor/outdoor classification based on a metric threshold.

FIG. 5 is a flow chart of an example process 500 for determining an indoor/outdoor classification based on a metric threshold. In some implementations, one or more process blocks of FIG. 5 may be performed by geolocator system 210. In some implementations, one or more process blocks of FIG. 5 may be performed by another device or a group of devices separate from or including geolocator system 210, such as measurement processor device 220, base station 230, mobile device 240, and/or network resource 265.

As shown in FIG. 5, process 500 may include obtaining metric information for one or more calls in an area (block 510). For example, geolocator system 210 may obtain metric information for one or more calls in an area. The area may include, for example, a cell of mobile network 260, a sector that is served by a particular base station 230, a bin (e.g., a subdivision of a sector), a geographic region of a particular size, or the like. The one or more calls may include a voice call, a video call, a VoIP call, a VoLTE call, a call segment, or the like.

The metric information may relate to a channel on which a call is placed and/or an operating environment in which the call is placed. For example, the metric information may include information relating to a transmit power level associated with mobile device 240, a downlink path loss between base station 230 and mobile device 240, a downlink received signal code power (RSCP) associated with mobile device 240, a downlink received energy per chip (Ec) for mobile device 240, a downlink noise power density (NO) for mobile device 240, a received signal reference quality (RSRQ) for mobile device 240, a power headroom identifier for mobile device 240, a channel quality indication (CQI), a sub-band CQI, information according to an E-UTRA standard (e.g., LTE 36.331, LTE 36.423, etc.), or the like. Additionally, or alternatively, the metric information may include an uplink received signal strength indicator (RSSI) associated with base station 230, an uplink signal-to-noise ratio (SNR) for information received by base station 230, a signal-to-interference-plus-noise (SINR) ratio, a downlink propagation loss for base station 230, a received total wideband power (RTWP), or the like.

In some implementations, the metric information may include information relating to a signal quality of a device-to-device link between mobile devices 240, an availability of a device-to-device link, a signal quality of a wireless access signal (e.g., a WiFi signal, a Bluetooth signal, etc.), an availability of a wireless access signal, an availability of a relay and/or repeater, a signal strength of a relay and/or repeater, a signal quality of a relay and/or repeater, a measurement relating to another radio access technology (RAT), a measurement relating to an available channel/frequency within a particular RAT, or the like.

In some implementations, geolocator system 210 may obtain the metric information from OSS 250, or from network resource 265. For example, mobile devices 240 may provide metric information to base stations 230. The base stations 230 may provide the metric information to OSS 250, and OSS 250 may process (e.g., sort, parse, etc.) the metric information. For example, OSS 250 may divide the metric information based on areas corresponding to the metric information, based on mobile devices 240 with which the metric information is associated, or the like.

In some implementations, geolocator system 210 may obtain the metric information from base station 230. For example, base station 230 may be associated with an application programming interface that permits geolocator system 210 to obtain metric information from base station 230. In this way, geolocator system 210 conserves processor and storage resources of OSS 250 by obtaining the metric information from base station 230. In some implementations, geolocator system 210 may obtain the metric information from mobile device 240. In this way, geolocator system 210 conserves processor and storage resources of base station 230 and OSS 250.

As further shown in FIG. 5, process 500 may include obtaining a metric threshold, based on which to determine whether the one or more calls are indoor calls or outdoor calls (block 520). For example, geolocator system 210 may obtain a metric threshold. Geolocator system 210 may use the metric threshold to determine whether each call, of the one or more calls, is an indoor call or an outdoor call, as described in more detail in connection with block 540, below. Geolocator system 210 may obtain the metric threshold from data storage component 430, which may receive the metric threshold from measurement processor device 220. Measurement processor device 220 may determine the metric threshold based on past metric information and geolocation information for a particular area, as described in more detail in connection with FIG. 6, below.

In some implementations, geolocator system 210 may obtain the metric threshold based on information identifying the area. For example, geolocator 410 may obtain metric information for the area, and may query data storage component 430 for a metric threshold pertaining to the area (e.g., based on a cell global identity (CGI), an enhanced cell global identity (E-CGI), a location area code (LAC), a latitude/longitude of the area, etc.).

As further shown in FIG. 5, process 500 may include determining geolocation information for the one or more calls (block 530). For example, geolocator system 210 may determine geolocation information for the one or more calls. The geolocation information may identify estimated geographical locations of mobile devices 240 that participated in the one or more calls, mobility information identifying whether mobile devices 240 that participated in the one or more calls were stationary or in motion at a threshold speed, one or more cells where mobile devices 240 that participated in the one or more calls were located, an uncertainty in an estimated geographical location of mobile devices 240 that participated in the one or more calls, or the like.

In some implementations, geolocator system 210 may determine the geolocation information based on information provided by mobile device 240. For example, geolocator system 210 may determine the geolocation information based on a latitude/longitude obtained by mobile device 240 (e.g., based on a GPS component of mobile device 240), based on a local area network with which mobile device 240 is connected, based on a location input by a user, or the like. Additionally, or alternatively, geolocator system 210 may determine the geolocation information based on information provided by mobile network 260. For example, geolocator system 210 may determine the geolocation information by triangulating a location of mobile device 240 from signal strengths of signals received by multiple base stations 230, from times that the multiple base stations 230 received the signals, or the like.

As further shown in FIG. 5, process 500 may include determining an indoor/outdoor classification for the one or more calls based on the metric information, the geolocation information, and/or the metric threshold (block 540). For example, geolocator system 210 may determine an indoor/outdoor classification for the one or more calls. Geolocator system 210 may determine the indoor/outdoor classification based on the metric information, the geolocation information, and/or the metric threshold. For example, geolocator system 210 may determine the indoor/outdoor classification by comparing a metric value for a particular call to a metric threshold for the area in which the particular call was placed. When the metric value satisfies the metric threshold, geolocator system 210 may classify the particular call as occurring outside (e.g., outside of any building in the area). When the metric value does not satisfy the metric threshold, geolocator system 210 may classify the particular call as occurring inside (e.g., inside of a building in the area).

As an example, assume that geolocator system 210 obtains an RSRP value of −60 decibel meters (dBm) from mobile device 240 in an area. Assume further that geolocator system 210 obtains a metric threshold for the area of −70 dBm. The metric threshold may be based on RSRP values from mobile devices 240 in the area. In this example, geolocator system 210 may classify the call as an outdoor call based on the RSRP value of −60 dBm being greater than the metric threshold of −70 dBm. Now assume that the metric threshold for the area is −50 dBm. In this example as changed, geolocator system 210 may classify the call as an indoor call.

In some implementations, geolocator system 210 may obtain multiple metric thresholds for a particular area. For example, measurement processor device 220 may determine multiple metric thresholds corresponding to different types of metric values for a particular area, and geolocator system 210 may obtain the multiple metric thresholds. Geolocator system 210 may obtain metric information of the different types included in the multiple metric thresholds, and may determine the indoor/outdoor classification information based on the multiple metric thresholds. For example, geolocator system 210 may compare metric values for each of the multiple metric thresholds to the respective metric thresholds, and may determine a result based on the comparisons (e.g., may average the results of the comparisons, may determine a weighted average of the results of the comparisons based on relative weights of the metric thresholds, etc.).

As an example, assume that geolocator system 210 obtains an RSRP value of −85 dBm, a SNR value of 37 dB, and a CQI value of 18 from mobile device 240 for a call in a particular area. Assume further that geolocator system 210 obtains a metric threshold RSRP value of −90 dB, a metric threshold SNR value of 40 dB, and a metric threshold CQI value of 20. In this example, geolocator system 210 may compare the RSRP value, the SNR value, and the CQI value to the metric thresholds. Here, the RSRP value and the CQI value indicate that the call is an outdoor call, and the SNR value indicates that the call is an indoor call. Geolocator system 210 may determine the indoor/outdoor classification information by selecting the classification indicated by a majority of the metric values (i.e., the classification of the call as an outdoor call). In some implementations, geolocator system 210 may perform a weighted average of the classifications, in a situation where one or more of the metric values are assigned a higher weight than others of the metric values. In this way, geolocator system 210 determines indoor/outdoor classification information based on multiple types of metric values, which improves accuracy of the classification and versatility of geolocator system 210.

In some implementations, geolocator system 210 may determine the indoor/outdoor classification based on information from one or more areas that neighbor a particular area. For example, assume that geolocator system 210 is determining indoor/outdoor classification information for calls placed in a particular cell. In that case, geolocator system 210 may use determine the indoor/outdoor classification for the calls based on indoor/outdoor classification information, metric information, a metric threshold, or the like, for calls placed in cells that neighbor the particular cell. In this way, geolocator system 210 determines indoor/outdoor classification information based on information regarding neighboring areas, which improves accuracy of the indoor/outdoor classification information.

In some implementations, geolocator system 210 may determine the indoor/outdoor classification based on the geolocation information. For example, when the geolocation information for a particular call indicates that the particular call was placed in a moving vehicle, geolocator system 210 may classify the call as occurring outdoors based on the assumption that a moving vehicle is outside any nearby buildings. In this way, geolocator system 210 conserves time and processor resources that would otherwise be consumed to perform the comparison of the metric threshold to the metric information.

As another example, when the geolocation information for a particular call unambiguously identifies a location inside a building, with sufficient accuracy to ensure that the particular call was placed inside the building (e.g., such that a margin of error for the geolocation information is entirely within the confines of the building), geolocator system 210 may classify the call as occurring indoors.

In some implementations, geolocator system 210 may use geolocation information to supplement a classification of a call. For example, when the comparison of the metric threshold to the metric information does not conclusively indicate whether the call was placed or received indoors or outdoors, geolocator system 210 may use the geolocation information to determine a classification. For example, if the geolocation information identifies a circle that mobile device 240 is likely to be within, geolocator system 210 may determine the classification based on whether part or all of the circle falls within a building (e.g., based on a center point of the circle, based on a majority of the circle, etc.).

In some implementations, geolocator system 210 may classify a call based on a device-to-device link between a mobile device 240 that placed the call and another mobile device 240. For example, assume that a first mobile device 240 places a call, and assume that the first mobile device 240 is associated with a device-to-device link with a second mobile device 240. If geolocator system 210 determines that the second mobile device 240 is indoors (e.g., based on geolocation information, based on an indoor/outdoor classification for the second mobile device 240, based on a velocity of the second mobile device 240, etc.), geolocator system 210 may classify the call as an indoor call. As another example, geolocator system 210 may determine a relative velocity of the first mobile device 240 in relation to the second mobile device 240, and may classify the call as an indoor call or an outdoor call based on the relative velocity.

In some implementations, geolocator system 210 may classify a call based on an indoor/outdoor classification of a device to which mobile device 240 is connected. For example, if mobile device 240 that placed a call is connected with a device (e.g., base station 230, a relay, a repeater, mobile device 240, a wireless access point, etc.) that is located indoors, geolocator system 210 may determine that mobile device 240 is likely to be located indoors. Geolocator system 210 may classify the call as an indoor call accordingly.

In some implementations, geolocator system 210 may classify a call as unclassifiable with regard to whether the call was placed indoors or outdoors. For example, in a situation where geolocator system 210 does not receive metric information for the call, geolocator system 210 may classify the call as unclassifiable. As another example, in a situation where metric information for a call is inconclusive with regard to whether a call was placed indoors or outdoors (e.g., when a first metric indicates that the call was placed indoors and a second metric indicates that the call was placed outdoors, etc.), geolocator system 210 may classify the call as unclassifiable.

As further shown in FIG. 5, process 500 may include providing indoor/outdoor classification information, geolocation information, metric information, and/or information identifying the area (block 550). For example, geolocator system 210 may provide indoor/outdoor classification information, geolocation information, metric information, and/or information identifying the area in which the one or more calls were placed. In some implementations, geolocator 410 of geolocator system 210 may provide the indoor/outdoor classification information, the geolocation information, the metric information, and/or the information identifying the particular area to queue producer 420.

In some implementations, geolocator system 210 may provide the indoor/outdoor classification information concurrently with the geolocation information. For example, geolocator system 210 may provide the indoor/outdoor classification information and the geolocation information as part of the same data transmission or collection of data transmissions, as part of the same message or collection of messages, as part of the same output, as part of the same string, as part of the same array, or the like.

Queue producer 420 may store the information (e.g., in a buffer, such as a short-term memory cache, or the like), and may provide the information to be stored by data storage component 430. Data storage component 430 may store the indoor/outdoor classification information, the geolocation information, the metric information, and/or the information identifying the particular area. In this way, geolocator system 210 determines indoor/outdoor classification information as geolocator system 210 determines geolocation information, which conserves time and processor resources that may otherwise be used to determine the indoor/outdoor classification information after providing the geolocation information and/or the metric information for storage.

In some implementations, geolocator system 210 may provide the indoor/outdoor classification information, mobility information, geolocation information, and/or metric information to measurement processor device 220. Measurement processor device 220 may use the indoor/outdoor classification information, geolocation information, and/or metric information to determine a metric threshold, based on which to determine future indoor/outdoor classification information, as described in more detail in connection with FIG. 6, below.

In some implementations, geolocator system 210 may determine configuration actions to perform to cause one or more base stations 230 to be adjusted based on the indoor/outdoor classification information, the geolocation information, and/or the metric information. For example, geolocator system 210 may determine one or more configuration actions to be performed (e.g., by base station 230), with regard to an uplink, to update a power level, to update a cell geometry, to update a signal modulation/coding scheme, or the like. The configuration action may include, for example, modifying transmitted power levels, neighbor cell relation tables, antenna electrical tilts, antenna mechanical tilts, antenna pointing direction/angles (e.g., elevation, tilt, and/or azimuth), handover thresholds, or the like. In some implementations, geolocator system 210 may recommend deactivating one or more base stations 230 and/or activating one or more base stations 230. In this way, geolocator system 210 may determine configuration actions to perform with regard to one or more base stations 230 based on the indoor/outdoor classification information and, thereby, improve mobile network performance.

In some implementations, geolocator system 210 may determine configuration activities to perform with regard to mobile device 240. For example, based on the indoor/outdoor classification of a call placed by mobile device 240, geolocator system 210, or another device (e.g., OSS 250, network resource 265, etc.) may cause mobile device 240 to increase or decrease a transmit power level, increase or decrease a metric reporting threshold (e.g., a threshold value of a metric at which mobile device 240 reports the value of the metric to mobile network 260 or another device), increase or decrease a handover threshold, increase or decrease an inter-radio-access-technology (inter-RAT) threshold, switch from a first radio access technology to a second radio access technology, switch from a first channel to a second channel, connect to a particular base station 230, or the like. In this way, geolocator system 210 improves network performance by causing reconfiguration of mobile device 240.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
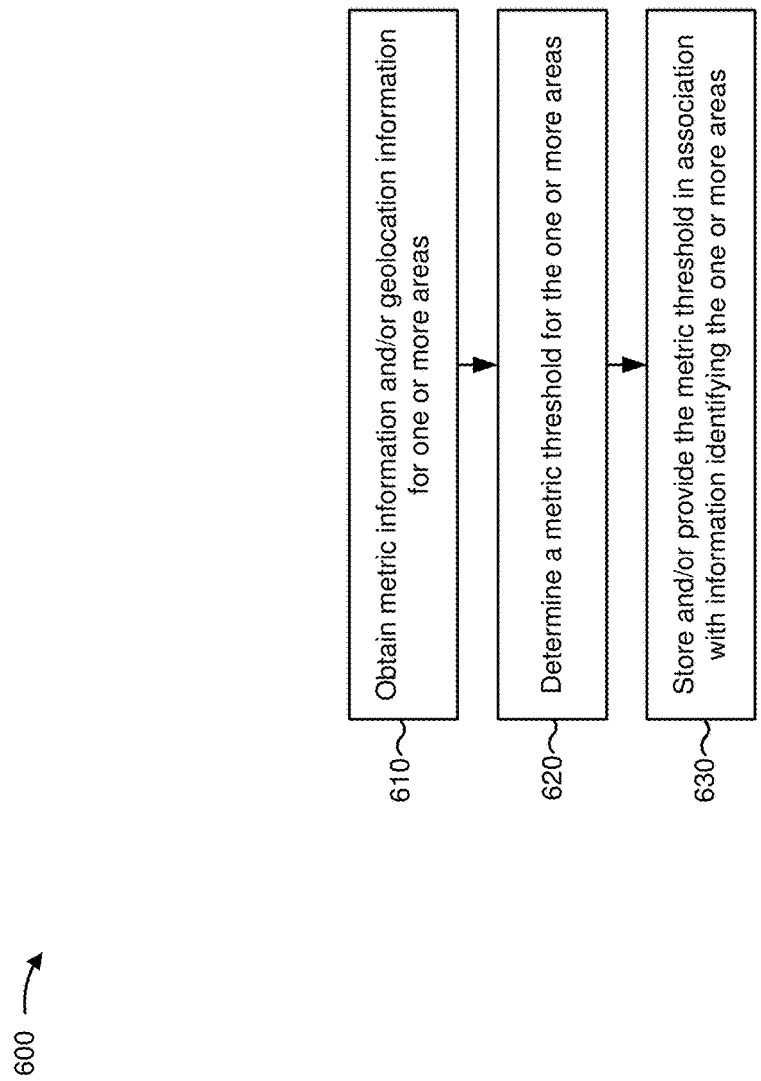
FIG. 6 is a flow chart of an example process for determining a metric threshold based on metric information.

FIG. 6 is a flow chart of an example process 600 for determining a metric threshold based on metric information. In some implementations, one or more process blocks of FIG. 6 may be performed by measurement processor device 220. In some implementations, one or more process blocks of FIG. 6 may be performed by another device or a group of devices separate from or including measurement processor device 220, such as geolocator system 210, base station 230, mobile device 240, and/or network resource 265.

As shown in FIG. 6, process 600 may include obtaining metric information and/or geolocation information for one or more areas (block 610). For example, measurement processor device 220 may obtain metric information and/or geolocation information for one or more areas. In some implementations, measurement processor device 220 may obtain the metric information and/or geolocation information from geolocator system 210 (e.g., data storage component 430 of geolocator system 210, etc.). In some implementations, measurement processor device 220 may obtain the metric information and/or geolocation information to determine the metric threshold periodically (e.g., based on a time schedule, such as every fifteen minutes, once per hour, once per day, once per week, etc.).

As further shown in FIG. 6, process 600 may include determining a metric threshold for the one or more areas (block 620). For example, measurement processor device 220 may determine a metric threshold for the one or more areas. Measurement processor device 220 may determine the metric threshold based on the metric information, the geolocation information, and/or the indoor/outdoor classification information. The metric threshold may define a metric value based on which to determine an indoor/outdoor classification. For example, the metric threshold may define a particular RSRP value, a particular RSCP value, a particular RxLev value, or the like. In some implementations, measurement processor device 220 may determine multiple metric thresholds, corresponding to multiple, different types of metrics.

Measurement processor device 220 may determine the metric threshold based on a theoretical metric value for the particular area. For example, measurement processor device 220 may use a path-loss model (e.g., a model that predicts a signal strength degradation based on a distance between base station 230 and mobile device 240) for a type of environment associated with the particular area (e.g., urban, rural, highway, etc.) for call signals to determine the theoretical metric value. In some implementations, measurement processor device 220 may use the theoretical metric value as the metric threshold.

In some implementations, measurement processor device 220 may adjust the metric measurement value to determine an adjusted threshold. For example, measurement processor device 220 may adjust the theoretical metric value based on a measurement taken by a technician at the particular area (e.g., RxLev measurements, RSRP measurements, RSCP measurements, or the like), based on an expected deviation from the conditions contemplated by the path-loss model (e.g., for mobile devices 240 on a busy road as compared to a quiet road, with other conditions of the path-loss model unchanged, etc.), based on comparing information identifying whether one or more calls were placed in an indoor environment to indoor/outdoor classification information for the one or more calls, or the like.

In some implementations, measurement processor device 220 may determine a metric threshold based on a past metric threshold. For example, measurement processor device 220 may store past metric thresholds for a period of time, and may determine a current metric threshold based on some of, or all of, the past metric thresholds. Measurement processor device 220 may determine the current metric threshold based on an average of the past metric thresholds, based on a weighted average of the past metric thresholds, based on a value of a most recent metric threshold, based on an analogous metric threshold (e.g., for a corresponding day of the week, a corresponding quantity of mobile devices 240 in the area, etc.), or the like.

As further shown in FIG. 6, process 600 may include storing and/or providing the metric threshold in association with information identifying the one or more areas (block 630). For example, measurement processor device 220 may store and/or provide the metric threshold in association with information identifying the one or more areas. In some implementations, measurement processor device 220 may cause geolocator system 210 (e.g., data storage component 430 of geolocator system 210) to store the metric threshold in association with information identifying the one or more areas. In this way, measurement processor device 220 permits geolocator system 210 to obtain the metric threshold by querying data storage component 430, which conserves processor resources of measurement processor device 220 that may otherwise be used to provide the metric threshold to geolocator system 210.

In some implementations, measurement processor device 220 may remove an existing metric threshold from usage. For example, measurement processor device 220 may store (e.g., provide for storage) information identifying a time when a metric threshold was determined. When the metric threshold reaches an age threshold (e.g., one hour old, one day old, one week old, etc.), measurement processor device 220 may cause geolocator system 210 to stop using the metric threshold. For example, measurement processor device 220 may cause geolocator system 210 to delete the metric threshold, may determine and provide a new metric threshold for geolocator system 210 to use, or the like. In this way, measurement processor device 220 updates the metric threshold based on an age of the metric threshold, which improves accuracy of indoor/outdoor classification information and reduces time and processor resources required to determine and/or provide the metric threshold.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
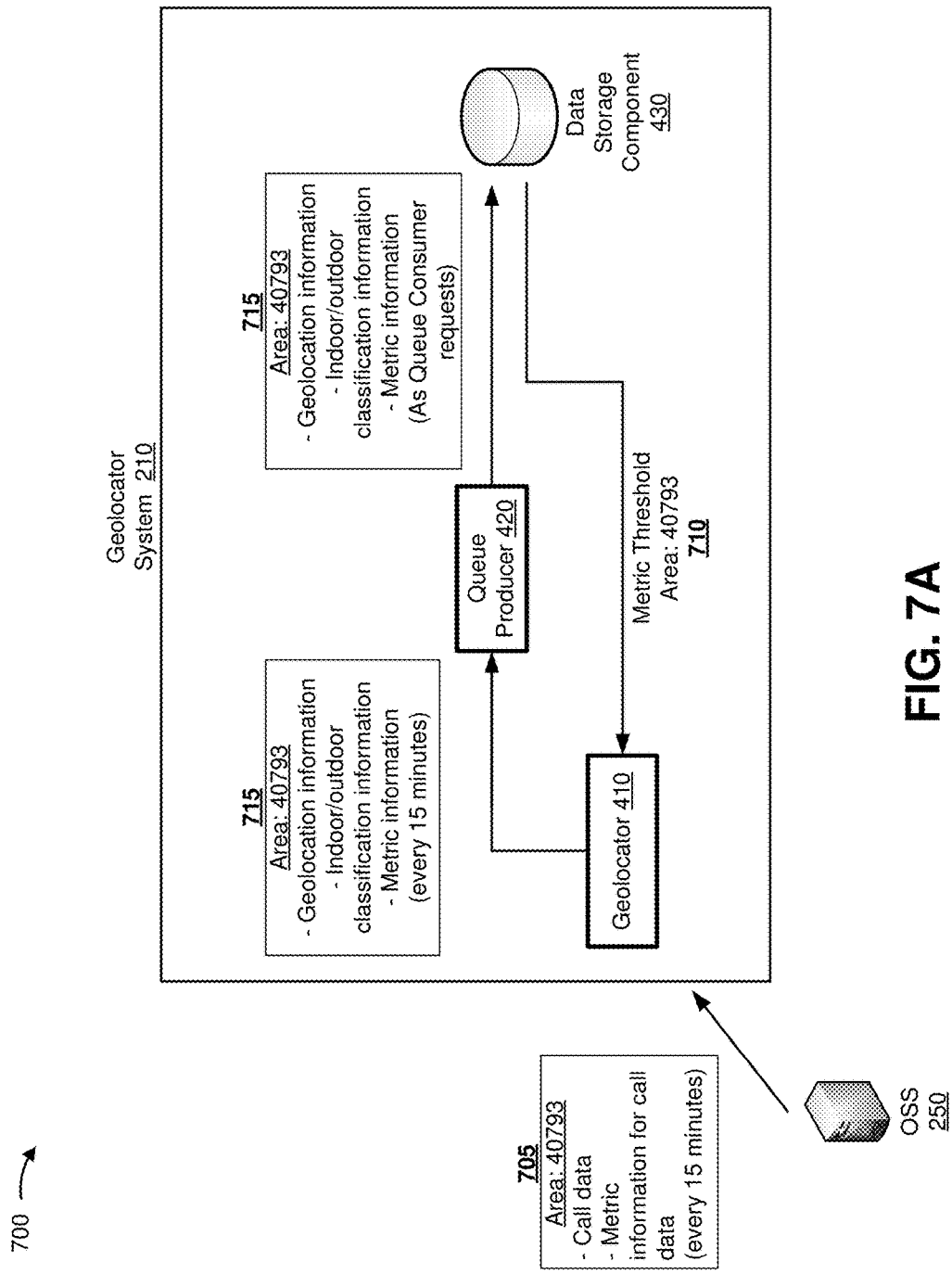
FIGS. 7A and 7B are diagrams of an example implementation relating to the example processes shown in FIGS. 5 and 6.
Figure 7B:
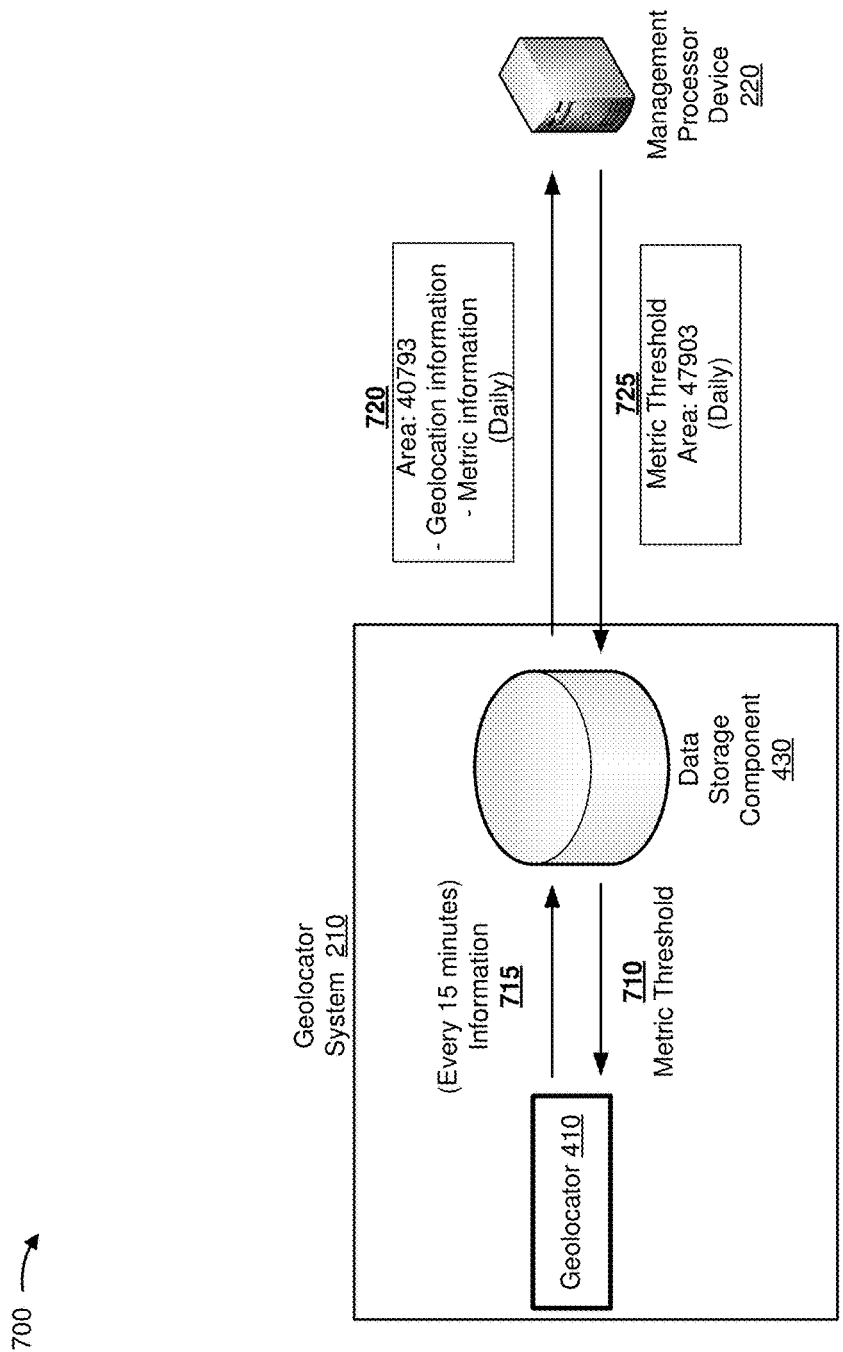

FIGS. 7A and 7B are diagrams of an example implementation 700 relating to example processes 500 and 600 shown in FIGS. 5 and 6. FIGS. 7A and 7B show an example of determining indoor/outdoor classification information based on metric information, and an example of determining a metric threshold based on metric information and/or geolocation information.

As shown in FIG. 7A, and by reference number 705, OSS 250 may provide, to geolocator system 210, call data for a particular area (e.g., area 40793) and metric information relating to the call data. As further shown, OSS 250 may provide the call data and metric information at a particular interval (e.g., every fifteen minutes). As shown by reference number 710, geolocator 410 may obtain a metric threshold for the particular area from data storage component 430.

Assume that data storage component 430 stores the metric threshold based on receiving the metric threshold from measurement processor device 220 (e.g., via queue producer 420), as described in more detail in connection with FIG. 7B.

As shown by reference number 715, geolocator 410 may provide geolocation information, indoor/outdoor classification information, the call data, and the metric information (hereinafter referred to as "information 715") to queue producer 420. As further shown, queue producer 420 may provide information 715 to data storage component 430. For example, queue producer 420 may provide information 715 to a queue consumer associated with data storage component 430. In some implementations, queue producer 420 may provide information 715 based on a write speed of data storage component 430. For example, the queue consumer associated with data storage component 430 may request the information as a write speed of data storage component 430 permits data storage component 430 to store the information.

As shown in FIG. 7B, in some implementations, geolocator 410 may determine the indoor/outdoor classification information based on a particular interval. Here, geolocator 410 obtains the metric threshold and provides information 715 to data storage component 430 (e.g., via queue producer 420) every fifteen minutes. As shown, in some implementations, measurement processor device 220 may determine the metric threshold at a different interval than the interval for the indoor/outdoor classification information. Here, the interval for determining the metric threshold is once per day.

As shown by reference number 720, measurement processor device 220 obtains the geolocation information, the call data, and the metric information once per day. Assume that measurement processor device 220 determines the metric threshold based on the geolocation information, the call data, and/or the metric information. As shown by reference number 725, measurement processor device 220 provides the metric threshold for storage on data storage component 430 once per day. In this way, measurement processor device 220 updates a metric threshold less frequently than geolocator system 210 receives call data and determines indoor/outdoor classification information based on the metric threshold and the call data, which conserves processor resources of measurement processor device 220 and/or geolocator system 210.

As indicated above, FIGS. 7A and 7B are provided merely as an example. Other examples are possible and may differ from what was described with regard to FIGS. 7A and 7B.

Implementations described herein permit a geolocator system to classify calls as indoor/outdoor as the geolocator system determines other geolocation information (e.g., a latitude/longitude of the mobile device that participates in the call, a determination of whether the mobile device is moving in a vehicle, etc.). Further, implementations described herein permit the geolocator system, or another device, to queue classified call data for storage, which reduces impact of the classification operation on processing and storage speed. Based on the classified call data, a network operator may improve performance of the network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors configured to:
      obtain metric information relating to an operating environment,
         the metric information describing at least one of a signal strength or a signal quality associated with one or more calls placed in the operating environment;
      obtain a threshold for the metric information;
      determine geolocation information identifying one or more geographical locations associated with the one or more calls;
      store the geolocation information in a queue producer before the geolocation information is provided to a data storage component that permits querying of information associated with past calls;
      determine indoor/outdoor classification information that identifies whether the one or more calls are classified as an indoor call or an outdoor call based on whether the metric information satisfies the threshold,
         the indoor/outdoor classification information being determined before the geolocation information is provided to the data storage component;
      store the indoor/outdoor classification information in the queue producer before the geolocation information is provided to the data storage component; and
      provide the indoor/outdoor classification information, stored in the queue producer, concurrently with the geolocation information, stored in the queue producer, to the data storage component.

2. The device of claim 1, where the one or more processors are configured to:
   receive information identifying an area at which the one or more calls were placed or received; and
   where the one or more processors, when obtaining the threshold, are configured to:
      obtain the threshold based on the threshold being associated with the area.

3. The device of claim 2, where the area includes one or more of:
   a cell of a mobile network,
   a sector of a mobile network,
   a bin of a cell or sector of a mobile network,
   a bin, cell, or sector neighboring a bin, cell, or sector where the one or more calls were placed or received,
   a coverage area of a relay, or
   a wireless access point coverage area.

4. The device of claim 1, where the one or more processors, when determining the geolocation information, are configured to:
   determine mobility information indicating whether the one or more calls are placed or received by a mobile device moving at least a threshold speed; and
   where the one or more processors, when determining the indoor/outdoor classification information, are configured to:
      determine the indoor/outdoor classification information further based on the mobility information.

5. The device of claim 1, where the one or more processors are configured to:
   classify a call, of the one or more calls, as an unclassifiable call,
      the call being classified as an unclassifiable call based on at least one of:
         not receiving metric information corresponding to the call, or
         determining that metric information corresponding to the call is inconclusive with regard to whether the call was placed indoors or outdoors.

6. The device of claim 1, where the one or more processors are configured to:
   cause one or more mobile devices to be reconfigured based on the metric information, the indoor/outdoor classification information, or the geolocation information.

7. The device of claim 1, where the one or more processors, when determining the indoor/outdoor classification information, are configured to:
   determine the indoor/outdoor classification information for a call, of the one or more calls,
      the call being classified as an outdoor call when the metric information satisfies the threshold, and
      the call being classified as an indoor call when the metric information does not satisfy the threshold.

8. A non-transitory computer-readable medium storing instructions, the instructions comprising:

one or more instructions that, when executed by one or more processors, cause the one or more processors to:
  obtain metric information,
    the metric information identifying at least one of a signal strength or a signal quality of one or more calls;
  obtain a threshold for the one or more calls;
  determine geolocation information identifying one or more geographical locations associated with the one or more calls;
    store the geolocation information in a queue producer before the geolocation information is provided to a data storage component that permits querying of information associated with past calls;
    determine indoor/outdoor classification information that identifies whether the one or more calls are classified as indoor calls or outdoor calls based on whether the metric information satisfies the threshold,
      the indoor/outdoor classification information being determined before the geolocation information is provided to the data storage component;
    store the indoor/outdoor classification information in the queue producer before the geolocation information is provided to the data storage component; and
    provide the indoor/outdoor classification information, stored in the queue producer, concurrently with the geolocation information, stored in the queue producer, to the data storage component.

9. The non-transitory computer-readable medium of claim 8, where the one or more instructions, when executed by the one or more processors, cause the one or more processors to:
  determine a configuration action for a base station to perform,
    the configuration action being determined based on at least one of:
      the metric information,
      the indoor/outdoor classification information,
      the geolocation information, or
      mobility information indicating whether the one or more calls are placed or received by a mobile device moving at at least a threshold speed relative to another device.

10. The non-transitory computer-readable medium of claim 9, where the configuration action includes at least one of:
  modifying a transmitted power level,
  modifying a neighbor cell relation table,
  modifying an antenna electrical tilt,
  modifying an antenna mechanical tilt,
  modifying an antenna pointing direction,
  modifying a handover threshold,
  activating the base station, or
  deactivating the base station.

11. The non-transitory computer-readable medium of claim 8, where the one or more calls are placed or received in a particular area; and
  where the one or more instructions, that cause the one or more processors to obtain the metric information, cause the one or more processors to:
    obtain the metric information from a base station associated with the particular area or from one or more mobile devices that placed or received the one or more calls.

12. The non-transitory computer-readable medium of claim 11, where a call, of the one or more calls, includes two or more call segments; and
  where the one or more instructions, that cause the one or more processors to determine the indoor/outdoor classification information, cause the one or more processors to:
    determine indoor/outdoor classification information for the two or more call segments.

13. The non-transitory computer-readable medium of claim 8, where the one or more instructions, that cause the one or more processors to obtain the threshold, cause the one or more processors to:
  obtain the threshold from the data storage component.

14. The non-transitory computer-readable medium of claim 8, where the one or more instructions, that cause the one or more processors to obtain the metric information, cause the one or more processors to:
  periodically obtain the metric information based on a time schedule.

15. A method, comprising:
  obtaining, by a device, metric information for one or more calls associated with an area;
  determining, by the device, a threshold associated with the area;
  determining, by the device, geolocation information identifying one or more geographical locations associated with the one or more calls;
  storing, by the device, the geolocation information in a queue producer before the geolocation information is provided to a data storage component that permits querying of information associated with past calls;
  determining, by the device, indoor/outdoor classification information that identifies whether the one or more calls are classified as indoor calls or outdoor calls based on whether the metric information satisfies the threshold,
    the indoor/outdoor classification information being determined before the geolocation information is provided to the data storage component;
  storing, by the device, the indoor/outdoor classification information in the queue producer before the geolocation information is provided to the data storage component; and
  providing, by the device, the indoor/outdoor classification information, stored in the queue producer, concurrently with the geolocation information, stored in the queue producer, to the data storage component.

16. The method of claim 15, where determining the threshold comprises:
  periodically determining the threshold based on a time schedule.

17. The method of claim 15, where determining the threshold comprises:
  determining the threshold based on a path-loss model for call signals in the area.

18. The method of claim 17, where the threshold is a first threshold; and
  where the method further comprises:
    determining that an age of the first threshold satisfies an age threshold; and
    determining a second threshold based on the age of the first threshold satisfying the age threshold.

19. The method of claim 17, further comprising:
  determining an adjusted threshold based on the indoor/outdoor classification information,
    the adjusted threshold being determined based on comparing information identifying whether the one or more calls are indoor calls or outdoor calls to the indoor/outdoor classification information.

20. The method of claim 15, where obtaining the metric information further comprises:
- obtaining metric information including a plurality of types of metric values; and
- where determining the threshold further comprises:
    - determining a plurality of thresholds,
        - each threshold, of the plurality of thresholds, corresponding to a type of metric value, of the plurality of types of metric values.

* * * * *